Figure 1:
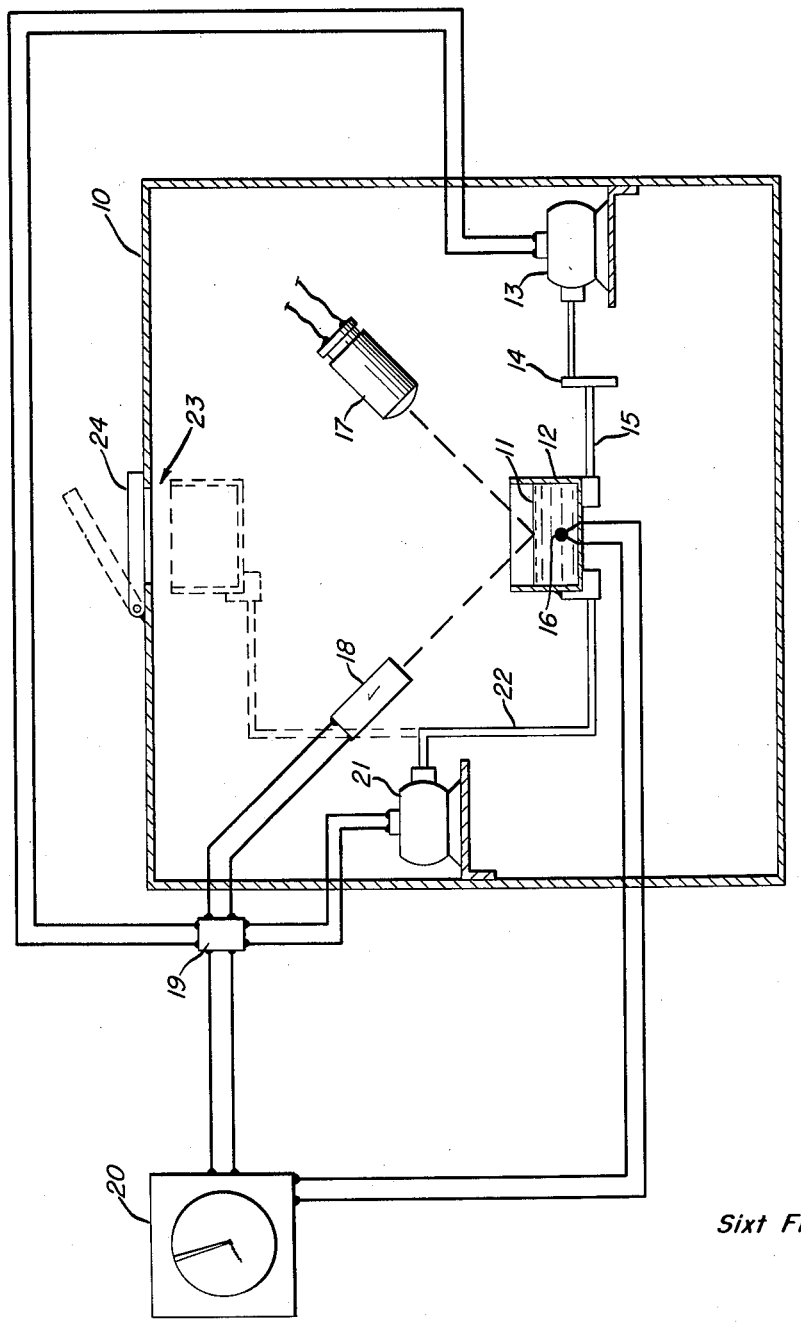

INVENTOR.
Sixt Frederick Kapff

Feb. 19, 1963 S. F. KAPFF 3,077,764
POUR POINT INSTRUMENT
Filed Oct. 30, 1959 2 Sheets-Sheet 2

INVENTOR.
Sixt Frederick Kapff

United States Patent Office 3,077,764
Patented Feb. 19, 1963

3,077,764
POUR POINT INSTRUMENT
Sixt Frederick Kapff, Homewood, Ill., assignor to Standard Oil Company, Chicago, Ill., a corporation of Indiana
Filed Oct. 30, 1959, Ser. No. 849,797
10 Claims. (Cl. 73—17)

This invention relates to an apparatus for determining the pour point of a liquid and particularly the pour point of petroleum products.

In the production of various petroleum products one of the most critical production specifications is that of pour point. Pour point is defined as being the lowest temperature at which an oil will just pour, or flow, under its own weight under specified conditions. The test is most generally carried out in the laboratory according to ASTM "Standard Method of Test for Cloud and Pour Points," D97–57, by placing a small quantity of oil into a standard bottle which is then placed in a succession of freezing mixtures. A thermometer is fixed in the oil, and as the temperature falls, the bottle is removed from the cooling bath at every 5° F. fall in temperature and tilted to determine whether the oil will flow. The lowest temperature at which the oil still remains liquid is known as the pour point. This test is very time consuming, requires the constant attention of an operator and is subject to errors by the operator. The production of many petroleum products such as lubricants and furnace oils is frequently limited by pour point specifications. In such a case a rapid means of measuring the pour point will enable the specification limit to be more nearly approached, and will aid in maximizing the efficiency of the production operation.

An object of this invention is an apparatus for automatically determining the pour point of a liquid in a simple accurate manner. Another object is an apparatus which reduces the time required for conducting a pour point test, and which does not demand the constant attention of an operator. Still a further object is a pour point apparatus which is suitable for plant use and whereby the time required for the production operator to obtain the test results is minimized. A particular object is an apparatus which will help maximize the operational efficiency of a plant producing products which must meet critical pour point specifications.

Figure 2:
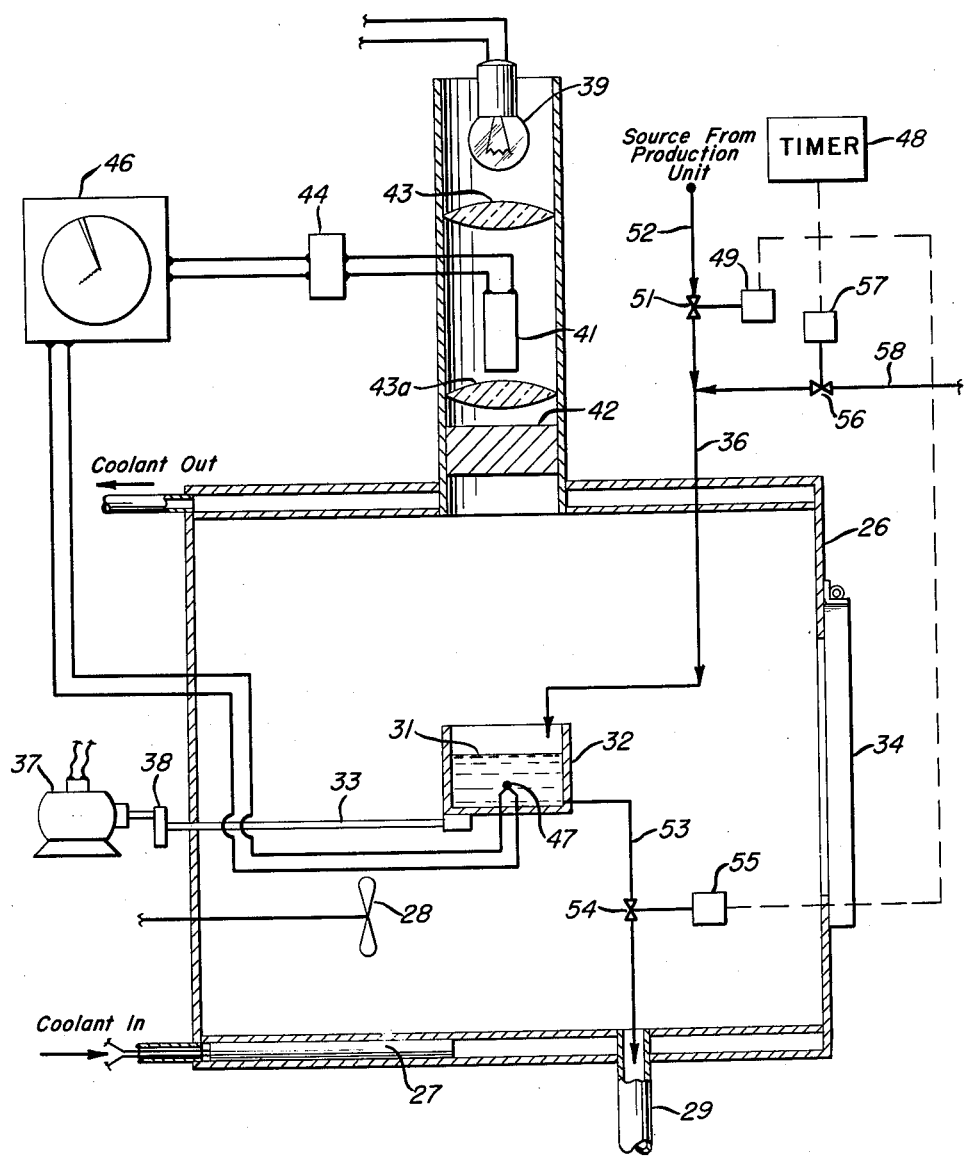

These objects are achieved by an apparatus which is comprised of a container enclosing a product sample which container is positioned in a cooling chamber and gently rocked while the sample is being cooled to its pour point. A ray of light is directed onto the sample surface and a photelectric cell is positioned to receive the light reflected from the surface. While the sample is fluid the surface remains horizontal and the reflected light is received by the photocell. When the pour point is reached the rocking motion causes the surface of the sample to tilt with the container. The reflected light is thus diverted away from the photocell, and relays are actuated to indicate the sample temperature and the test is concluded. A fuller understanding of my invention will be obtained by referring to the following description and accompanying drawings, wherein:

FIGURE 1 is a schematic representation of one form of the pour point apparatus suitable for either laboratory or production plant use, and FIGURE 2 is an elevation of a preferred embodiment of the invention, particularly adapted for completely automatic operation in production plant use.

Referring to the drawings, in FIGURE 1, a cooling bath 10 is used as a means for cooling a sample 11 of the product to be tested. Preferably the cooling bath 10 is a conventional freezer cabinet, capable of lowering the temperature to at least the pour point of a sample to be tested, normally in the range of 20 to —50° F., however, the range may vary depending upon the characteristics of the sample. An oil or other product to be tested is introduced into a sample container 12 which is placed in position so that it may be rocked by the action of the rocking motor 13, cam 14 and rocking arm 15. The motor 13 is of fractional horsepower and the speed is reduced by means of a gear train so that the sample container 12 is rocked about once a minute. A gentle to and fro motion is preferred, however, other motions may be used, such as a revolving movement or similar. The frequency of rocking may vary, but should be such that agitation of the sample surface does not result. The cam 14 and rocking arm 15 are so selected that the amplitude of the rocking motion is preferably about 8° from the horizontal. The amplitude may also vary, and should be such as to allow a substantial deviation from the horizontal, but not so great as to allow spillage of the sample.

As the sample is cooled to the pour point a temperature sensing device 16, either immersed in the sample or preferably, placed in a thermowell in the container 12 senses the temperature of the sample. The preferred temperature sensing device is a thermocouple which is connected to a recorder 20, which records the sample temperature during the test. A source of light 17 is directed onto the surface of the sample, and the light reflected from the surface is received by a light sensitive surface 18, preferably a photoelectric cell. The reflected light rays may be received directly by the photocell 18, or mirrors may be used to pick up the light. It is preferred to use ordinary white light as hereinbefore described, however, it is within the scope of the invention to utilize any source of radiation or wave emanations capable of being reflected from the surface of the sample 11, together with any appropriate receiver for the reflected rays. The angle of incidence of the rays striking the surface of the sample is not critical, but is selected to conform to the physical space limitations of the cooling bath used. While the sample is liquid its surface remains substantially horizontal and the reflected light is continuously received by the photocell 18. However, when the pour point is reached the solidification causes the surface of the sample to tilt from the horizontal with the rocking motion, and the reflected light is diverted away from the photocell 18. Relays 19 are connected with the photocell 18, the rocking motor 13 and a recorder 20. The photocell current may be amplified if necessary to actuate the relays. When the reflected light fails to reach photocell 18, relays 19 are actuated and the test is concluded; the lowest temperature recorded by recorder 20 is the pour point.

In order to facilitate the introduction of sample 11 into the container 12 a sample transport motor 21 and transport arm 22 may be used to transport the container 12 from the filling position 23 to its position on the rocking arm 15 when the test is begun. Access to the filling position may be had by opening a door 24 in the bath 10. This sample transport motor 21 may be connected with the relays 19 so that the container is transported to the filling position 23 at the conclusion of the test.

In FIGURE 2, wherein is shown an elevation of a preferred type of pour point apparatus, a cooling bath 26 utilizes a secondary refrigerant, preferably methylene chloride, which is cooled in conventional refrigeration equipment outside the bath 26. The bath 26 may be provided with a heater 27, preferably of electric resistance type, so that the cabinet may be defrosted when necessary. A fan 28 is used to circulate the air within the cabinet to obtain uniform temperatures during cooling and to speed the defrosting operation. A drain 29 is provided to remove water from the cabinet during the defrosting.

The sample 31 may be introduced into the container 32 manually by entry through door 34 and the container placed in position on the rocking arm 33. Alternately, in a completely automatic version of the pour point apparatus the sample may be introduced by means of line 36. The sample container 32 is attached to a rocking arm 33 and rocked by a rocking motor 37 and cam 38 as in the apparatus of FIGURE 1. A light source 39, aligned coaxially with a photocell 41, is positioned in a plane substantially normal to the horizontal surface of the sample. The light rays pass through a clear plastic window 42, strike the surface of the sample 31 and are reflected back into photocell 41. Lens 43 and 43a serve to concentrate the light and focus it after reflection from the sample surface, on the photocell 41. As in the apparatus of FIGURE 1, when the sample 31 is cooled to its pour point the surface tilts from the horizontal and the reflected light is diverted away from the photocell 41. This actuates relay 44, shutting off recorder 46 which has recorded the sample temperature sensed by thermocouple 47.

This apparatus is well adapted for automatically taking samples of the product to be tested directly from the production unit and testing such samples at preselected intervals of time. A timer 48 is used to regulate the functioning of all the component parts of the apparatus by individual connections or by a connection with a common power source. Any of the functional components of the apparatus may be reduced to automatic operation by the appropriate connections to the timer 48. For example, the timer 48 and driver 49 actuate valve 51 to allow a sample of the product from the production unit to pass by lines 52 and 36 into container 32. The timer 48 may also be connected to the recorder 46 and rocking motor 37 to start and stop the test automatically in conjunction with the introduction of the sample. The test is conducted as described before, and, upon being concluded, the cabinet may be heated by heater 27 to defrost the cabinet and to render the chilled sample fluid. The container 32 is drained by line 53 when valve 54 is actuated by means of the timer 48 and driver 55. The valve 56 is actuated by driver 57 connected with timer 48 to permit a flushing oil to enter the container 32 through lines 58 and 36 so as to cleanse it in preparation for receiving another sample to be tested. Valves 54 and 56 are then closed, the heater 27 is shut off and the apparatus is then ready to take another sample at the appropriate time.

A comparison was made with the standard ASTM method by conducting several runs on a number of oils, using the standard ASTM method and the instant apparatus. The results are shown in the following table:

*Table 1*

Pour Point (° F.)

|  | ASTM | Instant Apparatus |
| --- | --- | --- |
| Oil A | −10 | −11.7 |
| Oil B | −15 | −15.7 |
| Oil C | −20 | −17.5 |

The above data indicate that the pour points obtained by the instant apparatus are well within ±5° F. accuracy range obtainable by the standard ASTM method.

Thus, having fully described my invention, what I claim is:

1. An apparatus for determining the pour point of a liquid sample which comprises container means for enclosing said sample, means for cooling said sample to its pour point, means for rocking said container at intervals during the cooling of said sample so that the surface of said liquid sample remains in a substantially horizontal plane but wherein said surface tilts from the horizontal when the pour point of said sample is reached, means for detecting movement of the surface of the sample from a substantially horizontal plane, and means for indicating the temperature of said sample when the surface of said sample moves from a substantially horizontal plane.

2. An apparatus for determining the pour point of a liquid sample which comprises means for cooling said sample, container means for enclosing said sample, means for rocking said container at a preselected frequency and amplitude so that the surface of the liquid sample remains in a substantially horizontal plane, means for indicating the temperature of said sample, light source means for directing a ray of light onto the surface of said sample, light sensitive means for receiving the light reflected from the substantially horizontal surface of said sample, and means for indicating the temperature of said sample when the surface of said sample moves from a substantially horizontal plane.

3. The apparatus of claim 2 wherein the angle of incidence between the said light ray and a plane normal to the surface of said sample is less than 90°.

4. The apparatus of claim 2 wherein the said light source means and said receiving means are positioned coaxially in a plane substantially normal to the surface of said sample.

5. The apparatus of claim 2 wherein said cooling means is provided with a defroster means.

6. In apparatus for determining the pour point of a liquid sample a cooling bath means adapted to cool said sample to at least its pour point, a container adapted for enclosing a sample of said liquid, means for automatically transporting and positioning said container in said bath at a filling position and at a rocking position, means for rocking said container so that the surface of said liquid sample remains in a substantially horizontal plane, light source means for directing a ray of light onto the surface of said sample, means for receiving said light reflected from the substantially horizontal surface of said sample, means for indicating the temperature of said sample when the said light reflected from the surface of said sample is diverted away from said light receiving means by movement of the surface of said sample from a substantially horizontal plane.

7. An apparatus for automatically determining the pour point of a petroleum product which comprises a container for enclosing a sample of said product, means for cooling said sample to its pour point, means for introducing said sample into said container at preselected intervals of time, means for rocking said container so that the surface of said sample remains in a substantially horizontal plane, means for indicating and recording the temperature of said sample, light source means for directing a ray of light onto the surface of said sample, means for receiving said light reflected from the substantially horizontal surface of said sample, means connected to said light receiving means for stopping the test when said light reflected from the surface of said sample is diverted away from said light receiving means by movement of the surface of said sample from a substantially horizontal plane, means for draining said container, heater means for defrosting said cooling means, and means for flushing said container so that the apparatus is cleansed in preparation for receiving another sample at a preselected time.

8. The apparatus of claim 2 wherein said sample temperature indicating means comprises a temperature-sensing device, recorder means electrically connected to said device for providing a record of the temperature of said sample during the determination of the pour point thereof, and means electrically connected to said light-sensitive means and to said recorder means for concluding the test when the surface of said sample moves from a substantially horizontal plane.

9. The apparatus of claim 1 wherein said means for detecting movement of the surface of the sample from a substantially horizontal plane comprises a radiation source for directing rays onto the surface of said sample, said rays being reflected from said sample surface, receiver means positioned to receive rays reflected therefrom and being sensitive to the reflected rays to provide an indication of the movement of said sample surface from a substantially horizontal plane.

10. The apparatus of claim 1 wherein said sample temperature indicating means comprises a temperature-sensitive device for continuously sensing the temperature of said sample during the pour point test, temperature indicator means connected to said temperature-sensing device, said temperature indicator means also being connected to said means for detecting movement of the surface of the sample to signify the sample temperature at which the sample surface moves from a substantially horizontal plane.

References Cited in the file of this patent

UNITED STATES PATENTS

| | | |
|---|---|---|
| 1,944,164 | Bijur | Jan. 23, 1934 |
| 2,372,595 | Maxon | Mar. 27, 1945 |
| 2,465,040 | Robertson et al. | Mar. 22, 1949 |
| 2,635,456 | Barstow | Apr. 21, 1953 |
| 2,697,933 | Donath | Dec. 28, 1954 |